US012560548B2

(12) United States Patent
Manassen et al.

(10) Patent No.: US 12,560,548 B2
(45) Date of Patent: Feb. 24, 2026

(54) SPECTRAL ANGULAR METROLOGY

(71) Applicant: KLA Corporation, Milpitas, CA (US)

(72) Inventors: Amnon Manassen, Haifa (IL); Kevin Peterlinz, Fremont, CA (US); Andrew V. Hill, Berkley, CA (US); Shankar Krishnan, Santa Clara, CA (US); Yonatan Vaknin, Yoqneam Illit (IL); Ido Dolev, Milpitas, CA (US); Suryanarayanan Ganesan, Milpitas, CA (US); Chao Chang, San Jose, CA (US); Jongjin Kim, San Jose, CA (US); David Zimdars, Ann Arbor, MI (US)

(73) Assignee: KLA Corporation, Milpitas, CA (US)

( * ) Notice: Subject to any disclaimer, the term of this patent is extended or adjusted under 35 U.S.C. 154(b) by 0 days.

(21) Appl. No.: 18/822,901

(22) Filed: Sep. 3, 2024

(65) Prior Publication Data

US 2025/0076208 A1 Mar. 6, 2025

Related U.S. Application Data

(60) Provisional application No. 63/536,703, filed on Sep. 6, 2023.

(51) Int. Cl.
| | |
|---|---|
| G01N 21/88 | (2006.01) |
| G01N 21/95 | (2006.01) |
| G01N 21/956 | (2006.01) |

(52) U.S. Cl.
CPC ..... G01N 21/8806 (2013.01); G01N 21/9501 (2013.01); G01N 21/956 (2013.01);
(Continued)

(58) Field of Classification Search
CPC ... G01N 2021/8835; G01N 2021/8845; G01N 2021/8848; G01N 21/8806; G01N 21/9501; G01N 21/956; G01N 2201/061
(Continued)

(56) References Cited

U.S. PATENT DOCUMENTS

| | | |
|---|---|---|
| 7,483,143 B2 | 1/2009 | Sanders et al. |
| 8,120,778 B2 | 2/2012 | Fermann et al. |
| | (Continued) | |

FOREIGN PATENT DOCUMENTS

| | | |
|---|---|---|
| CN | 104316186 B | 8/2016 |
| GB | 2600728 B | 11/2022 |
| | (Continued) | |

OTHER PUBLICATIONS

Korean Intellectual Property Office, International Search Report and Written Opinion received in International Application No. PCT/US2024/045223, Dec. 11, 2024, 6 pages.
(Continued)

*Primary Examiner* — Tri T Ton
(74) *Attorney, Agent, or Firm* — Suiter Swantz IP

(57) ABSTRACT

A metrology system may include a dual frequency comb source providing a first comb beam with a first repetition rate and a second comb beam with a second repetition rate, a beamsplitter to generate one or more dual frequency comb illumination beams from the first comb beam and the second comb beam, and a beam combiner to form a dual frequency comb illumination beam from the first comb beam and the second comb beam. The system may further include an illumination sub-system to illuminate a sample with the dual frequency comb illumination beam through an objective lens, a collection sub-system to collect sample light from the sample with the objective lens, and a detector to capture a radio-frequency signal based on the sample light. The system may further extract spectral measurement data associated with the sample from the radio-frequency signal and generate metrology measurements based on the spectral measurement data.

29 Claims, 9 Drawing Sheets

(52) U.S. Cl.
CPC ................ *G01N 2021/8835* (2013.01); *G01N 2021/8845* (2013.01); *G01N 2021/8848* (2013.01); *G01N 2201/061* (2013.01)

(58) Field of Classification Search
USPC ........................................................ 356/612
See application file for complete search history.

(56) References Cited

U.S. PATENT DOCUMENTS

| | | | |
|---|---|---|---|
| 8,693,004 B2 | 4/2014 | Chandler et al. | |
| 8,917,396 B2 | 12/2014 | Picque et al. | |
| 9,557,219 B2 | 1/2017 | Newbury et al. | |
| 10,533,836 B2 | 1/2020 | Cundiff et al. | |
| 11,073,768 B2 | 7/2021 | Hill et al. | |
| 11,293,861 B2 | 4/2022 | Gianella et al. | |
| 11,300,405 B2 | 4/2022 | Manassen et al. | |
| 11,378,394 B1 | 7/2022 | Paskover et al. | |
| 11,378,451 B2 | 7/2022 | Wang et al. | |
| 11,796,925 B2 | 10/2023 | Lubashevsky et al. | |
| 2010/0225897 A1* | 9/2010 | Fermann | H01S 3/2383 356/450 |
| 2012/0206730 A1* | 8/2012 | Shioda | G01B 9/0209 356/450 |
| 2017/0307443 A1 | 10/2017 | Bekal et al. | |
| 2020/0409271 A1 | 12/2020 | Hill et al. | |
| 2021/0063243 A1 | 3/2021 | Anandarajah et al. | |
| 2021/0262857 A1 | 8/2021 | Sterczewski et al. | |
| 2021/0364935 A1 | 11/2021 | Gdor et al. | |
| 2022/0163389 A1 | 5/2022 | Marandi et al. | |
| 2023/0087964 A1 | 3/2023 | Nakamura et al. | |
| 2023/0314319 A1 | 10/2023 | Manassen et al. | |
| 2024/0280914 A1 | 8/2024 | Manassen et al. | |
| 2024/0377758 A1 | 11/2024 | Chouaib et al. | |
| 2024/0402615 A1 | 12/2024 | Weiss et al. | |
| 2025/0004384 A1 | 1/2025 | Kudyshev et al. | |
| 2025/0052666 A1 | 2/2025 | Chang et al. | |
| 2025/0060307 A1* | 2/2025 | Brown | G01J 3/42 |
| 2025/0328087 A1 | 10/2025 | Gdor et al. | |

FOREIGN PATENT DOCUMENTS

| | | |
|---|---|---|
| KR | 101398835 B1 | 5/2014 |
| WO | 2010010438 A2 | 1/2010 |
| WO | 2016196677 A1 | 12/2016 |
| WO | 2018152594 A1 | 8/2018 |
| WO | 2021224485 A1 | 11/2021 |

OTHER PUBLICATIONS

U.S. Appl. No. 18,196,219, filed May 11, 2023, Chouaib et al.
U.S. Appl. No. 18/217,199, filed Jun. 30, 2023, Kudyshev et al.
U.S. Appl. No. 18/370,136, filed Sep. 19, 2023, Weiss et al.
U.S. Appl. No. 18/642,417, filed Apr. 22, 2024, Gdor et al.
U.S. Appl. No. 18/677,487, filed May 29, 2024, Chang et al.
Coddington et al., "Dual-Comb Spectroscopy," Fraunhofer IPM, 2016, 2 pages.
Gotti et al., "Comb-locked frequency-swept synthesizer for high precision broadband spectroscopy," Scientific Reports, Feb. 13, 2020, 10 pages.
Picqué et al., "Frequency comb spectroscopy," Nature Photonics, 13, Feb. 21, 2019, 27 pages.
Zhu et al., "Dual-Comb Ranging," ScienceDirect, Engineering, Oct. 26, 2018, 9 pages.

* cited by examiner

<u>400</u>

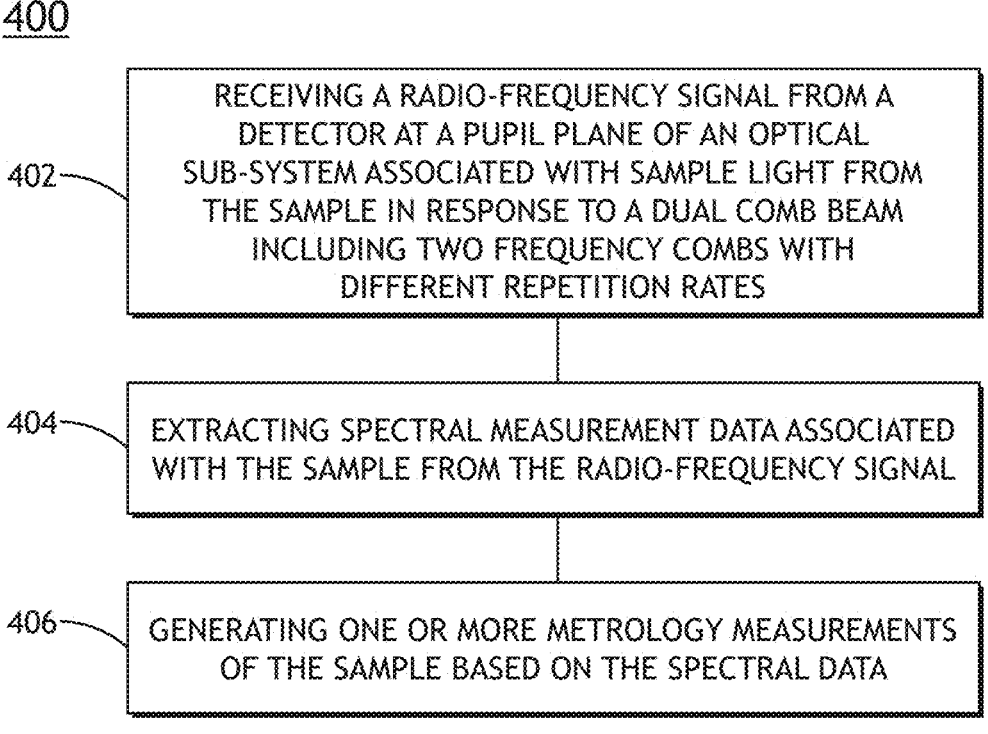

402 — RECEIVING A RADIO-FREQUENCY SIGNAL FROM A DETECTOR AT A PUPIL PLANE OF AN OPTICAL SUB-SYSTEM ASSOCIATED WITH SAMPLE LIGHT FROM THE SAMPLE IN RESPONSE TO A DUAL COMB BEAM INCLUDING TWO FREQUENCY COMBS WITH DIFFERENT REPETITION RATES

404 — EXTRACTING SPECTRAL MEASUREMENT DATA ASSOCIATED WITH THE SAMPLE FROM THE RADIO-FREQUENCY SIGNAL

406 — GENERATING ONE OR MORE METROLOGY MEASUREMENTS OF THE SAMPLE BASED ON THE SPECTRAL DATA

FIG.4

SPECTRAL ANGULAR METROLOGY

CROSS-REFERENCE TO RELATED APPLICATION

The present application claims the benefit under 35 U.S.C. § 119 (e) of U.S. Provisional Application Ser. No. 63/536,703, filed Sep. 6, 2023, entitled SPECTRAL ANGULAR METROLOGY, naming Kevin Peterlinz, Andrew V. Hill, Shankar Krishnan, Yonatan Vaknin, Ido Dolev, Suryanarayanan Ganesan, Chao Chang, Jongjin Kim, and David Zimdars as inventors, which is incorporated herein by reference in the entirety.

TECHNICAL FIELD

The present disclosure relates generally to spectral metrology and, more particularly, to spectral metrology using dual comb frequency sources.

BACKGROUND

Overlay metrology continues to be a Moore's law enabler. However, for this to continue, ever more sites per wafer are required for overlay monitoring and control in order to enable higher order model corrections. Specifically, Correction Per Exposure (CPE) is increasingly utilized, which requires intra field target measurements, which in turn increases a need for on-product target measurements. There is therefore a need to develop systems and methods to address the above deficiencies.

SUMMARY

In embodiments, the techniques described herein relate to a metrology system including a controller including one or more processors configured to execute program instructions causing the one or more processors to implement a metrology recipe by receiving a radio-frequency signal from a detector associated with illumination of a sample with a dual frequency comb illumination beam through an objective lens with an illumination sub-system and collection of sample light from the sample in response to the dual frequency comb illumination beam with the objective lens by a collection sub-system, where the dual frequency comb illumination beam includes two frequency combs with different repetition rates; extracting spectral measurement data associated with the sample from the radio-frequency signal; and generating one or more metrology measurements of the sample based on the spectral measurement data.

In embodiments, the techniques described herein relate to a metrology system, where the one or more metrology measurements include at least one of an overlay measurement, a tilt measurement, or a critical dimension measurement.

In embodiments, the techniques described herein relate to a metrology system, where the illumination sub-system includes an illumination polarizer and a rotatable illumination phase plate in an illumination path of the dual frequency comb illumination beam, where the collection sub-system includes a rotatable collection phase plate and an analyzer in an optical path of the sample light, where generating the one or more metrology measurements of the sample based on the spectral measurement data includes reconstructing data indicative of one or more Mueller matrix elements associated with the sample based on the spectral measurement data; and generating the one or more metrology measurements based on the data indicative of the one or more Mueller matrix elements.

In embodiments, the techniques described herein relate to a metrology system, where at least a portion of the radio-frequency signal is associated with zero-order diffraction from the sample, where at least a portion of the data indicative of the one or more Mueller matrix elements is associated with the zero-order diffraction from the sample.

In embodiments, the techniques described herein relate to a metrology system, where the illumination sub-system illuminates an in-die portion of the sample, where the one or more metrology measurements include in-die measurements.

In embodiments, the techniques described herein relate to a metrology system, where the illumination sub-system includes an illumination apodizer to generate one or more off-axis illumination lobes from the dual frequency comb illumination beam, where at least a portion of the radio-frequency signal is associated with first-order diffraction of the one or more off-axis illumination lobes by the sample.

In embodiments, the techniques described herein relate to a metrology system, where the illumination apodizer includes one or more curved apertures.

In embodiments, the techniques described herein relate to a metrology system, where the one or more curved apertures are shaped as one or more crescents.

In embodiments, the techniques described herein relate to a metrology system, where the illumination sub-system illuminates a metrology target on the sample.

In embodiments, the techniques described herein relate to a metrology system, where the metrology target includes an overlay metrology target.

In embodiments, the techniques described herein relate to a metrology system, where the metrology target includes at least one of an advanced imaging metrology (AIM) target or a robust AIM target.

In embodiments, the techniques described herein relate to a metrology system, where the metrology target includes a scatterometry overlay (SCOL) target.

In embodiments, the techniques described herein relate to a metrology system, where the illumination sub-system further provides an additional dual frequency comb illumination beam, where the illumination sub-system further includes an adjustable phase modulator and an additional apodizer in an optical path of the additional dual frequency comb illumination beam, where the additional apodizer generates one or more reference lobes of the additional dual frequency comb illumination beam; and an additional beam combiner to overlap the sample light with the one or more reference lobes of the additional dual frequency comb illumination beam to generate an interference pattern on the detector; where the radio-frequency signal includes phase-scan data associated with scanning a phase of the additional dual frequency comb illumination beam with the adjustable phase modulator.

In embodiments, the techniques described herein relate to a metrology system, where the metrology target includes a scatterometry overlay (SCOL) target, where at least a portion of the phase-scan data is associated with the first-order diffraction of the one or more off-axis illumination lobes by the sample.

In embodiments, the techniques described herein relate to a metrology system, where the metrology target includes one or more Moiré structures, where at least a portion of the phase-scan data is associated with the first-order diffraction of the one or more off-axis illumination lobes by the one or more Moiré structures.

In embodiments, the techniques described herein relate to a metrology system including a dual frequency comb source including a first frequency comb source providing a first comb beam with a first repetition rate; a second frequency comb source providing a second comb beam with a second repetition rate; and one or more beamsplitters to generate one or more dual frequency comb illumination beams from the first comb beam and the second comb beam; a beam combiner to combine the first comb beam and the second comb beam to form a dual frequency comb illumination beam; an illumination sub-system including one or more optical elements configured to illuminate a sample with the dual frequency comb illumination beam through an objective lens and a collection sub-system including one or more additional optical elements to collect sample light from the sample in response to the dual frequency comb illumination beam with the objective lens; a detector at a pupil plane of the collection sub-system configured to capture a radio-frequency signal based on the sample light; and a controller including one or more processors configured to execute program instructions causing the one or more processors to implement a metrology recipe by receiving the radio-frequency signal from the detector; extracting spectral measurement data associated with the sample from the radio-frequency signal; and generating one or more metrology measurements of the sample based on the spectral measurement data.

In embodiments, the techniques described herein relate to a metrology system, where the one or more metrology measurements include at least one of an overlay measurement, a tilt measurement, or a critical dimension measurement.

In embodiments, the techniques described herein relate to a metrology system, where the illumination sub-system includes an illumination polarizer and a rotatable illumination phase plate in an illumination path of the dual frequency comb illumination beam, where the illumination sub-system includes a rotatable collection phase plate and an analyzer in an optical path of the sample light, where generating the one or more metrology measurements of the sample based on the spectral measurement data includes reconstructing data indicative of one or more Mueller matrix elements associated with the sample based on the spectral measurement data; and generating the one or more metrology measurements based on the data indicative of the one or more Mueller matrix elements.

In embodiments, the techniques described herein relate to a metrology system, where at least a portion of the radio-frequency signal is associated with zero-order diffraction from the sample, where at least a portion of the data indicative of the one or more Mueller matrix elements is associated with the zero-order diffraction from the sample.

In embodiments, the techniques described herein relate to a metrology system, where the illumination sub-system illuminates an in-die portion of the sample, where the one or more metrology measurements include in-die measurements.

In embodiments, the techniques described herein relate to a metrology system, where the illumination sub-system includes an illumination apodizer to generate one or more off-axis illumination lobes from the dual frequency comb illumination beam, where at least a portion of the radio-frequency signal is associated with first-order diffraction of the one or more off-axis illumination lobes by the sample.

In embodiments, the techniques described herein relate to a metrology system, where the illumination apodizer includes one or more curved apertures.

In embodiments, the techniques described herein relate to a metrology system, where the one or more curved apertures are shaped as one or more crescents.

In embodiments, the techniques described herein relate to a metrology system, where the illumination sub-system illuminates a metrology target on the sample.

In embodiments, the techniques described herein relate to a metrology system, where the metrology target includes an overlay metrology target.

In embodiments, the techniques described herein relate to a metrology system, where the metrology target includes at least one of an advanced imaging metrology (AIM) target or a robust AIM target.

In embodiments, the techniques described herein relate to a metrology system, where the metrology target includes a scatterometry overlay (SCOL) target.

In embodiments, the techniques described herein relate to a metrology system, where the illumination sub-system provides an additional dual frequency comb illumination beam, where the illumination sub-system further includes an adjustable phase modulator and an additional apodizer in an optical path of the additional dual frequency comb illumination beam, where the additional apodizer generates one or more reference lobes of the additional dual frequency comb illumination beam; and an additional beam combiner to overlap the sample light with the one or more reference lobes of the additional dual frequency comb illumination beam to generate an interference pattern on the detector; where the radio-frequency signal includes phase-scan data associated with scanning a phase of the additional dual frequency comb illumination beam with the adjustable phase modulator.

In embodiments, the techniques described herein relate to a metrology system, where the metrology target includes a scatterometry overlay (SCOL) target, where at least a portion of the phase-scan data is associated with the first-order diffraction of the one or more off-axis illumination lobes by the sample.

In embodiments, the techniques described herein relate to a metrology system, where the metrology target includes one or more Moiré structures, where at least a portion of the phase-scan data is associated with the first-order diffraction of the one or more off-axis illumination lobes by the one or more Moiré structures.

In embodiments, the techniques described herein relate to a metrology method including receiving a radio-frequency signal from a detector at a pupil plane of an optical sub-system, where the optical sub-system is configured to illuminate a sample with a dual frequency comb illumination beam through an objective lens and collect sample light from the sample in response to the dual frequency comb illumination beam with the objective lens, where the dual frequency comb illumination beam includes two frequency combs with different repetition rates; extracting spectral measurement data associated with the sample from the radio-frequency signal; and generating one or more metrology measurements of the sample based on the spectral measurement data.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures.

FIG. 4 is a flow diagram illustrating steps performed in a method for metrology based on dual comb spectroscopy, in accordance with one or more embodiments of the present disclosure.

DETAILED DESCRIPTION

Figure 1A:
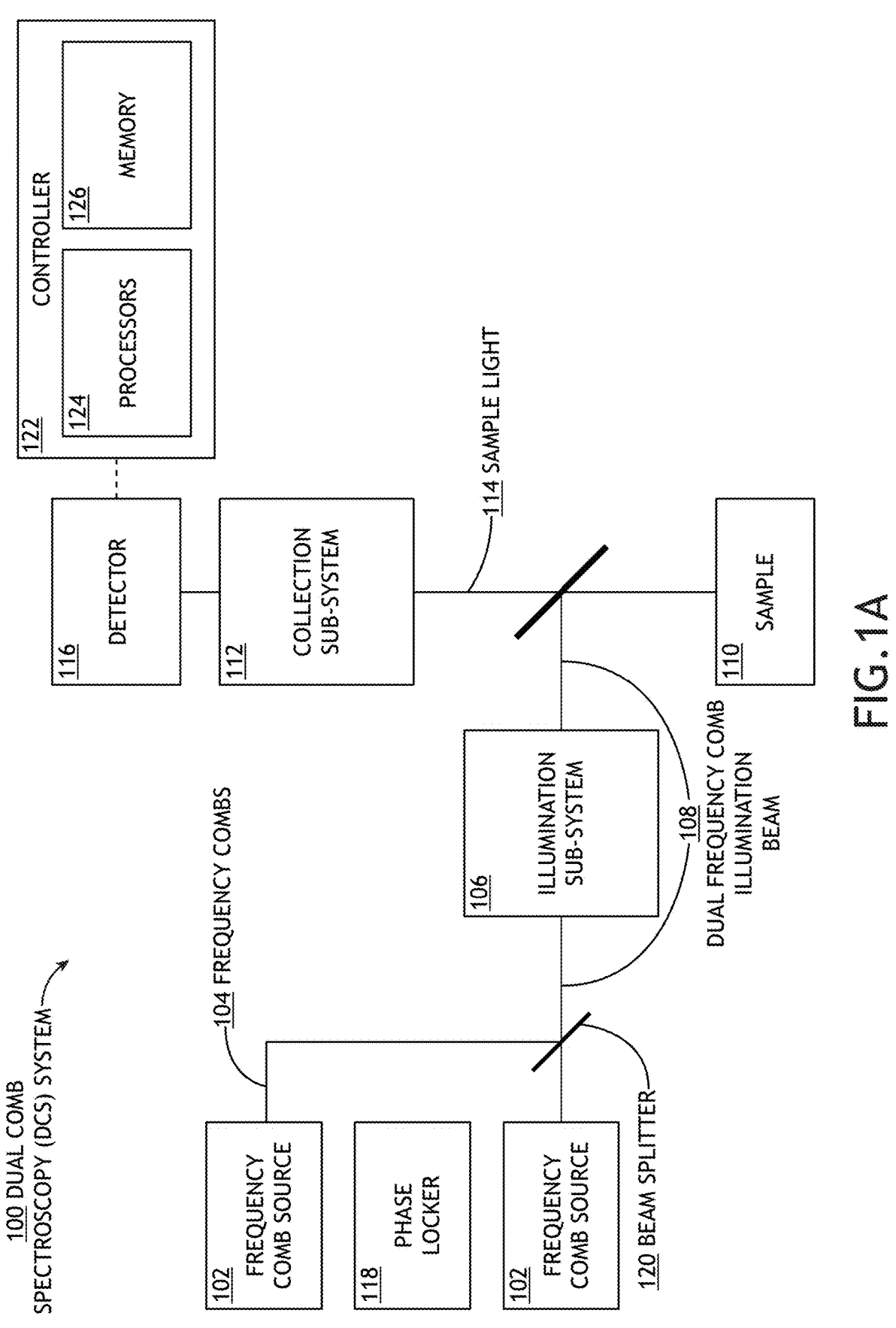
FIG. 1A illustrates a block diagram of a dual comb spectroscopy (DCS) metrology system, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to systems and methods providing spectral metrology using dual comb spectroscopy (DCS) techniques. In some embodiments, a DCS metrology system directs one or more lobes of a dual frequency comb illumination beam to a sample and generates one or more metrology measurements from associated sample light, where the dual frequency comb illumination beam is formed from two frequency combs having different repetition rates. In this configuration, the two frequency combs generate beat signals in a detector that encodes optical spectroscopic data. In particular, optical spectroscopic data associated with optical spectroscopy of the sample may be retrieved through a frequency analysis (e.g., a Fourier Transform analysis, or the like) of a radio-frequency (RF) signal generated by the detector. Dual comb spectroscopy is generally described in Ian Coddington, Nathan Newbury, and William Swann, "Dual-comb spectroscopy," Optica 3, 414-426 (2016); and Picqué, N., Hänsch, T. W. Frequency comb spectroscopy. Nature Photon 13, 146-157 (2019); both of which are incorporated herein by reference in their entireties.

It is contemplated herein that the systems and methods disclosed herein may support a wide range of metrology measurements using a single tool.

In some embodiments, a DCS metrology system may generate spectral ellipsometry (SE) measurements. In this configuration, the DCS metrology system may include polarization and/or phase manipulation optics (e.g., polarizers, phase plates, or the like) to manipulate the polarization and/or phase of the dual comb illumination beam and sample light (e.g., sample light corresponding to zero-order diffraction). In this way, SE measurements generated based on optical spectrum information derived from RF signals for various combinations of the polarization and/or phase manipulation optics. In particular, one or more Mueller matrix elements associated with the sample may be reconstructed. It is contemplated herein that such a configuration may provide various metrology measurements such as, but not limited to, overlay, tilt, critical dimension (CD), or the like. Further, this configuration may be suitable for, but is not limited to, in-die measurements of device features such as in-die overlay (IDO) measurements.

In some embodiments, a DCS metrology system may generate multi-spectral (e.g., multi-wavelength) overlay measurements of dedicated overlay targets using a variety of techniques. For example, a DCS metrology system may generate multi-spectral scatterometry overlay (SCOL) measurements. In this configuration, the DCS system may direct one or more illumination lobes of a dual comb illumination beam and collect first-order illumination from a detector at a pupil plane. As another example, a DCS metrology system may generate overlay measurements of overlay targets with overlapping periodic features of the same or different pitch in a scanning configuration through either physically scanning the sample or using a phase shifting technique. As an illustration, phase shifting may be implemented by splitting a portion of the dual comb illumination beam for use as a reference beam and interfering this reference beam with first-order diffraction on a detector. Further, phase control optics (e.g., an adjustable phase plate) may be used to scan the phase of the reference beam during a measurement. Optical metrology utilizing interference of sample light with a reference beam is generally described in U.S. patent application Ser. No. 18/110,746 filed on Feb. 16, 2023, which is incorporated herein by reference in its entirety.

Additionally, a DCS metrology system may be configurable to provide multiple measurements with any combination of the different configurations. For example, overlay measurements on dedicated overlay targets may be influenced by various aspects of the physical printed target (e.g., CD, tilt, or the like). Accordingly, a DCS metrology system may generate SE measurements of such shape-based parameters (e.g., based on collected zero-order light) in addition to diffraction-based techniques and may further correct diffraction-based overlay measurements based on the SE measurements.

A DCS metrology system may provide both in-die measurements (e.g., in-die overlay (IDO) measurements, or the like) and on-target measurements in a single tool. Further, a DCS metrology system may provide measurements at multiple process steps such as, but not limited to, after development inspection (ADI) measurements or after etch inspection (AEI) measurements. In this way, a single tool can be used for both high frequency on-target ADI metrology and in-die AEI metrology. Additionally, data from a DCS metrology system may provide measurements needed to calibrate between ADI and AEI measurements, which may be referred to as non-zero offset (NZO) or mis-reading correction (MRC). It is contemplated herein that the ability to measure full spectrum, angular, and phase information scattered off a device with a DCS metrology system is valuable for metrology accuracy and stability. Enabling the measurement of small-pitch ADI targets with the same tool as IDO may further increase value and utilization.

Additionally, a DCS metrology system may be implemented with a high numerical aperture (NA) objective (e.g., NA>0.9, NA>0.93, or the like) and a fast measurement throughput, which may provide benefits over existing techniques. For example, existing implementations of optical techniques such as, but not limited to, angular scatterometry and SE have relatively fast throughput and thus a better cost of ownership (CoO) over non-optical techniques such as scanning electron microscopy (SEM), but suffer from the extended nature of the photons that couple neighboring geometric and compositional variations into the overlay measurements. For instance, angular scatterometry, being an intensity sensor, has little independent sensitivity to such variations in spite of the rich angular content offered by a ~0.93NA system. SE, having rich spectral and phase information, does offer independent sensitivity to geometrical and compositional variations but suffers from an extended spot size (~25 μm) that is marginal for future use cases. Also, while having 3 obtuse angles that are effective for thin logic layers, sharper angles' scattered information, available from thicker structures that will be encountered even more frequently in future nodes, are not collected using typical techniques. However, a DCS metrology system as disclosed herein may provide a power and flexible platform for a wide range of measurements with a single tool using a small spot size (e.g., 3 μm or less in some cases) and may be suitable for both in-die measurements and measurements of dedicated targets.

Referring now to FIGS. 1A-4, systems and methods providing DCS metrology are described in greater detail, in accordance with one or more embodiments of the present disclosure.

FIG. 1A illustrates a block diagram of a DCS metrology system 100, in accordance with one or more embodiments of the present disclosure.

In embodiments, the DCS metrology system 100 includes one or more frequency comb sources 102 to generate two phase-locked frequency combs 104 having different frequency comb spacings, an illumination sub-system 106 to direct a dual frequency comb illumination beam 108 formed from a combination of the frequency combs 104 to a sample 110, a collection sub-system 112 to collect light emanating from the sample 110 (referred to herein as sample light 114), and a detector 116 to capture the sample light 114. The detector 116 may further generate RF signals associated with beating of the frequency combs 104, where optical spectroscopic data of the sample 110 is encoded into frequency components of the RF signals.

The dual frequency comb illumination beam 108 may be generated using any suitable technique. In some embodiments, as shown in FIG. 1A, the DCS metrology system 100 includes two frequency comb sources 102 to generate two frequency combs 104 with different frequencies, where the relative frequencies may be fixed (e.g., f and f+Af) or programmable.

The frequency comb sources 102 may include any combination of components suitable for generating frequency combs 104 using any technique. The frequency comb sources 102 may be provided as separate components coupled by a phase locker 118 (e.g., electrical and/or optical components to phase-lock the frequency combs 104 in frequency f and phase φ) or may be provided as a single component. Further, the DCS metrology system 100 may include a beam splitter 120 (e.g., a beam combiner) to align and overlap the two frequency combs 104 along a colinear optical path to form the dual frequency comb illumination beam 108. The beam splitter 120 may include any type or combination of optical elements suitable for aligning and overlapping the frequency combs 104 such as, but not limited to, a beamsplitter as shown in FIG. 1A.

The DCS metrology system 100 may illuminate any portion of a sample 110 with the dual frequency comb illumination beam 108 during a measurement. In some embodiments, the DCS metrology system 100 illuminates one or more features within a die on a semiconductor sample associated with a device being fabricated (e.g., device features). In some embodiments, the DCS metrology system 100 illuminates a metrology target on the sample 110, which may include features dedicated for metrology. Such a metrology target may be located in a die (e.g., an in-die target) or within a scribe line. For example, an overlay metrology target may include periodic features on one or more layers of the sample 110 designed to generate diffraction orders of light having optical frequencies (e.g., ultraviolet frequencies, visible frequencies, infrared frequencies, or the like), where metrology measurements may be generated based on sample light 114 associated with these diffraction orders (e.g., diffraction-based overlay (DBO) techniques).

The detector 116 may include any type of sensing element suitable for generating RF signals associated with beats of the frequency comb signals in the sample light 114, where optical spectroscopy data associated with the sample 110 is embedded in frequency content of the RF signals. In some embodiments, the detector 116 includes a multi-pixel sensor. In this way, each pixel may generate RF signals from incident sample light 114. For example, the detector 116 may include a two-dimensional sensor such as, but not limited to, a coupled metal-oxide-semiconductor (CMOS) device, a charge-coupled device (CCD), or the like. As another example, the detector 116 may include a photodiode array (e.g., two or more photodiodes in any arrangement). In some embodiments, the detector 116 includes a single-pixel sensor (e.g., a single photodiode, or the like).

The detector 116 may be placed at any suitable location to capture any distribution of sample light 114 suitable for a particular metrology measurement. In some embodiments, the detector 116 is placed at a pupil plane of the collection sub-system 112 to capture an angular distribution of sample light 114. In some embodiments, the detector 116 is placed at a field plane (e.g., a plane conjugate to the sample 110) to provide a spatially-resolved image of the sample 110.

The illumination sub-system 106 may include one or more optical elements to modify properties of the dual frequency comb illumination beam 108 such as, but not limited to, a polarization, a phase, a number of illumination lobes, or incidence angles (e.g., polar incidence angles and/or azimuth incidence angles). Similarly, the collection sub-system 112 may include one or more optical elements to modify properties of the sample light 114 such as, but not limited to, a polarization, a phase, collection angles passed to the detector 116 (e.g., portions of a collection pupil passed to the detector 116), or selected diffraction orders passed to the detector 116. Further, in some embodiments, a portion of the dual frequency comb illumination beam 108 is split prior to the sample 110 to form a reference beam that is interfered with at least a portion of the sample light 114. In this configuration, the DCS metrology system 100 may include additional optical elements to modify properties of the reference beam such as, but not limited to, phase or polarization.

Taken together, the illumination sub-system 106 and the collection sub-system 112 may be configured to support any type or combination of metrology measurements based on optical spectroscopic data from an RF signal associated with interaction of the dual frequency comb illumination beam 108 with a sample 110 including, but not limited to, a SE measurement or diffraction-based measurement.

The DCS metrology system 100 may further include a controller 122 with one or more processors 124 configured to execute program instructions stored (e.g., maintained) on memory 126, or a memory device. Further, the controller 122 may be communicatively coupled to any components of the DCS metrology system 100 such as, but not limited to, the detector 116. In this way, the one or more processors 124 of controller 122 may execute any of the various process steps described throughout the present disclosure either directly or indirectly. For example, the processors 124 may extract optical spectroscopic data associated with the sample 110 from the RF signals generated by the detector 116. As another example, the processors 124 may generate one or more metrology measurements associated with the sample 110. The processors 124 may generate any type of metrology measurements including, but not limited to, overlay measurements, tilt measurements, CD measurements, or the like. The metrology measurements may be generated based on any technique including, but not limited to, extracting Mueller matrix information associated with the sample using SE techniques or analysis of light associated with one or more diffraction orders in a diffraction-based technique.

The DCS metrology system 100 may be configured to implement one or more metrology recipes, where a metrology recipe may include configuration information associated with the DCS metrology system 100 and/or the sample 110. For example, a metrology recipe may include configuration parameters of the dual frequency comb illumination beam 108 such as, but not limited to, constituent repetition rates, wavelength, polarization, phase, or incidence angle (e.g., azimuth and/or polar incidence angle). As another example, a metrology recipe may include configuration parameters of the sample light 114 used for a measurement such as, but not limited to, wavelength, polarization, phase, or collection angle. As another example, a metrology recipe may include information about the sample 110 including, but not limited to, pitch or orientation of features to be characterized. As another example, a metrology recipe may include a sampling plan including locations on the sample 110 to be characterized. As another example, a metrology recipe may include processing steps for generating metrology measurements from measurement data.

Referring now to FIGS. 1B-1E, various non-limiting configurations of the DCS metrology system 100 for differ-ent measurements are described, in accordance with one or more embodiments of the present disclosure.

Figure 1B:
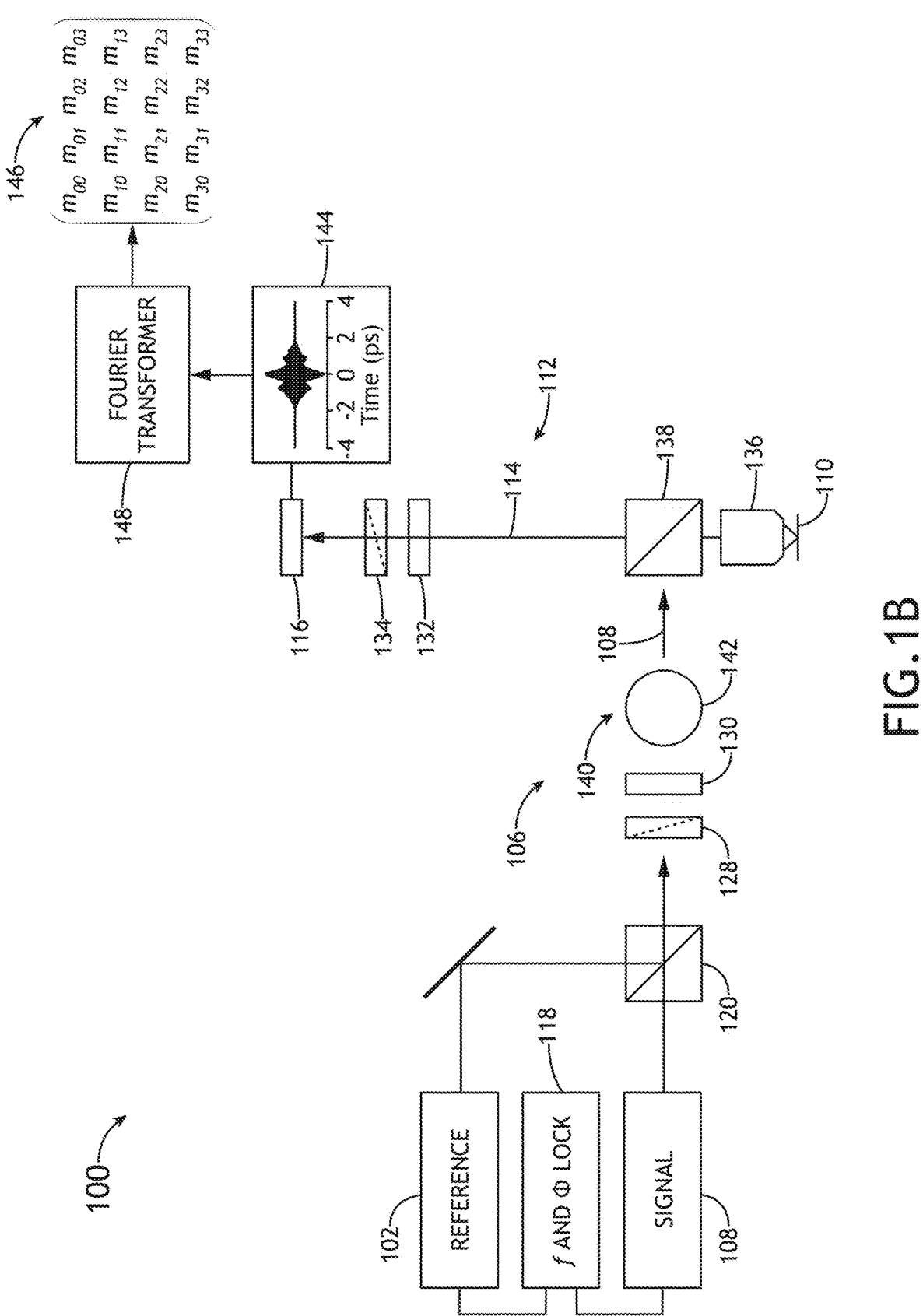
FIG. 1B illustrates a schematic of the DCS metrology system configured for spectral ellipsometry (SE) measurements, in accordance with one or more embodiments of the present disclosure.

FIG. 1B illustrates a schematic of the DCS metrology system 100 configured for SE measurements, in accordance with one or more embodiments of the present disclosure.

In FIG. 1B, the illumination sub-system 106 and the collection sub-system 112 together include components suitable for performing SE metrology. For example, FIG. 1B depicts a configuration in which the illumination sub-system 106 includes a polarizer 128 and a rotating phase plate 130, and in which the collection sub-system 112 includes a rotating phase plate 132 and an analyzer 134. FIG. 1B further depicts a configuration in which the dual frequency comb illumination beam 108 is incident on the sample 110 at a normal incidence angle. In particular, the configuration in FIG. 1B includes an objective lens 136 and a beam splitter 138 common to both the illumination sub-system 106 and the collection sub-system 112 such that the objective lens 136 both directs the dual frequency comb illumination beam 108 to the sample 110 and collects sample light 114 from the sample 110. Additionally, the inset 140 in FIG. 1B depicts an open aperture 142 in an illumination pupil plane, which enables the full utilization of the NA of the objective lens 136 for illumination as well as collection.

It is contemplated herein that the configuration in FIG. 1B may capture full spectral, angular, and polarization information from a measured area on a sample 110 using a relatively small spot size (e.g., less than 3 μm) when using an objective lens 136 with a NA of 0.93 for illumination and collection, which may enable a wide variety of measurements.

As an illustration, the configuration in FIG. 1B may operate as a SE metrology tool where optical spectroscopy data is extracted from RF signals generated by the detector 116 based on dual comb spectroscopy techniques. For example, the controller 122 may extract data associated with one or more Mueller matrix elements of the sample 110 (or other transfer matrix elements such as, but not limited to, Jones matrix elements) based on RF signals generated with one or more configurations of the polarization and/or phase states of light controlled by the illumination sub-system 106 and the collection sub-system 112. SE metrology is generally described in U.S. patent application Ser. No. 18/677,487 filed on May 29, 2024; U.S. Pat. No. 11,378,451 issued on Jul. 5, 2022; U.S. patent application Ser. No. 18/196,219 filed on May 11, 2023; and U.S. patent application Ser. No. 18/217,199 filed on Jun. 30, 2023; all of which are incorporated herein by reference in their entireties. It is contemplated that the systems and methods disclosed herein may utilize dual comb spectroscopy techniques to implement metrology measurements described in any of the above references.

For example, FIG. 1B depicts an RF signal 144 generated by the detector from which Mueller matrix elements 146 may be extracted using a frequency-based technique such as, but not limited to, a Fourier Transform technique 148. Although not shown, the Mueller matrix elements 146 may then be used to generate metrology measurements such as, but not limited to, overlay measurements, CD measurements, or tilt measurements.

Further, the configuration in FIG. 1B may be suitable for, but not limited to, metrology measurements of device features on a sample 110 (e.g., in-die measurements). As an illustration, the configuration in FIG. 1B may be suitable for in-die overlay (IDO) measurements.

Figure 1C:
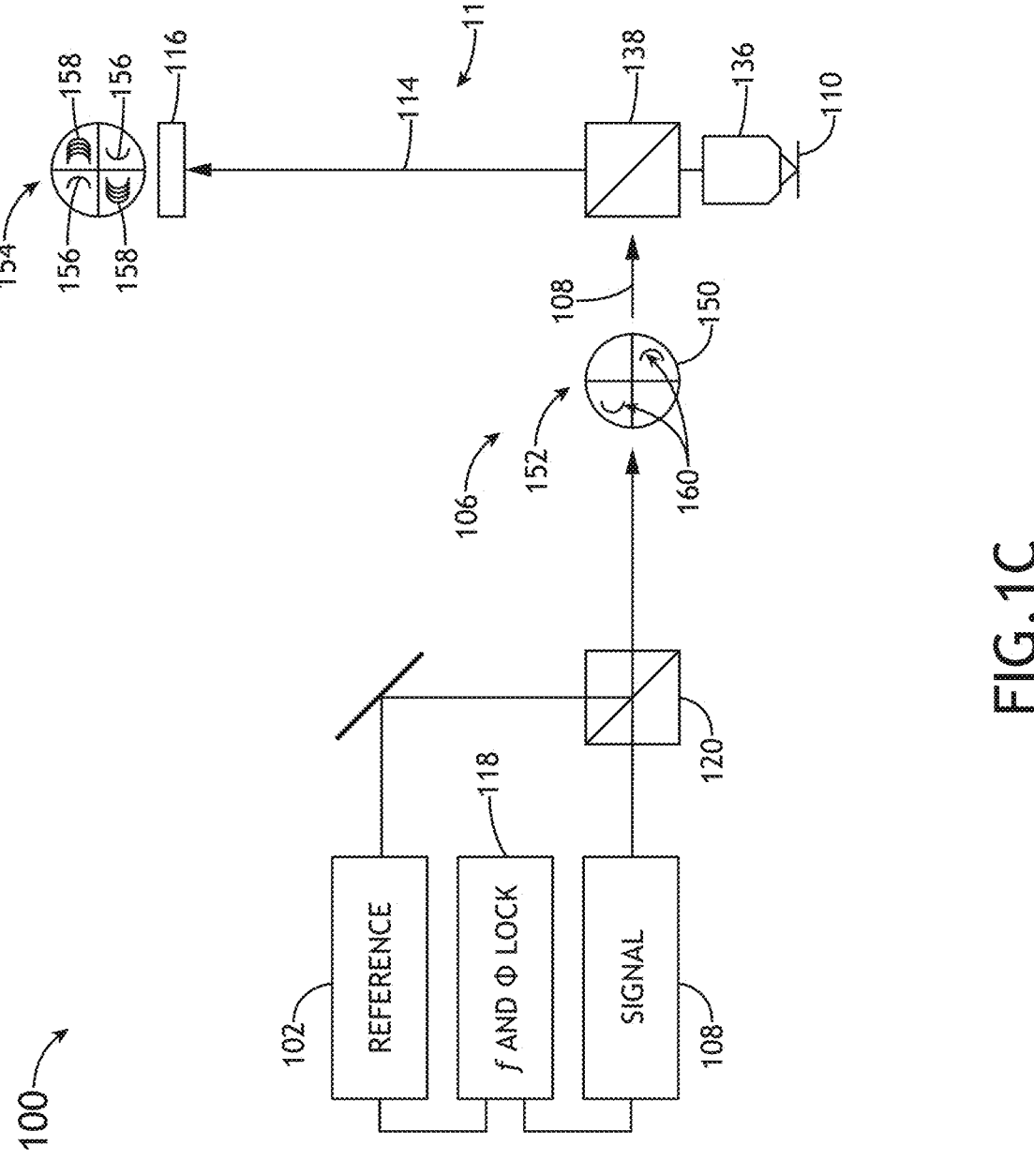
FIG. 1C illustrates a schematic of the DCS metrology system configured for multi-spectral first-order diffraction metrology of scatterometry overlay (SCOL) targets, in accordance with one or more embodiments of the present disclosure.

FIG. 1C illustrates a schematic of the DCS metrology system 100 configured for multi-spectral first-order diffraction metrology of SCOL targets, in accordance with one or more embodiments of the present disclosure.

In some embodiments, the illumination sub-system 106 and the collection sub-system 112 include optical elements arranged to generate a pupil image on the detector 116 based on illumination of a SCOL target with one or more illumination lobes of the dual frequency comb illumination beam 108, where the pupil image includes at least first-order diffraction.

FIG. 1C depicts a configuration in which the illumination sub-system 106 includes an apodizer 150 to generate two lobes of the dual frequency comb illumination beam 108 that are incident on the sample 110 at opposing azimuth incidence angles in a rotated dipole configuration, which is illustrated in inset 152. The inset 154 then depicts zero-order diffraction 156 and spectrally dispersed first-order diffraction 158 of the two lobes of the dual frequency comb illumination beam 108 by the sample 110 (e.g., the SCOL overlay target 200 in FIG. 2, or the like). In this configuration, the controller 122 may generate multi-spectral metrology measurements (e.g., overlay measurements) based on the various lobes of spectrally-dispersed first-order diffraction 158 captured by the detector 116.

The apodizer 150 may have openings with any shape to provide lobes of the dual frequency comb illumination beam 108 with any shape. For example, the apodizer 150 may include openings shaped to promote spectral band separation of the first-order diffraction 158 and/or overlap of diffraction orders with a reference beam. In some embodiments, as depicted in FIG. 1C, the apodizer 150 includes one or more curved apertures 160 (e.g., one or more apertures shaped as an arc or a crescent) to create curved diffraction lobes (e.g., as shown in inset 154).

Figure 2:
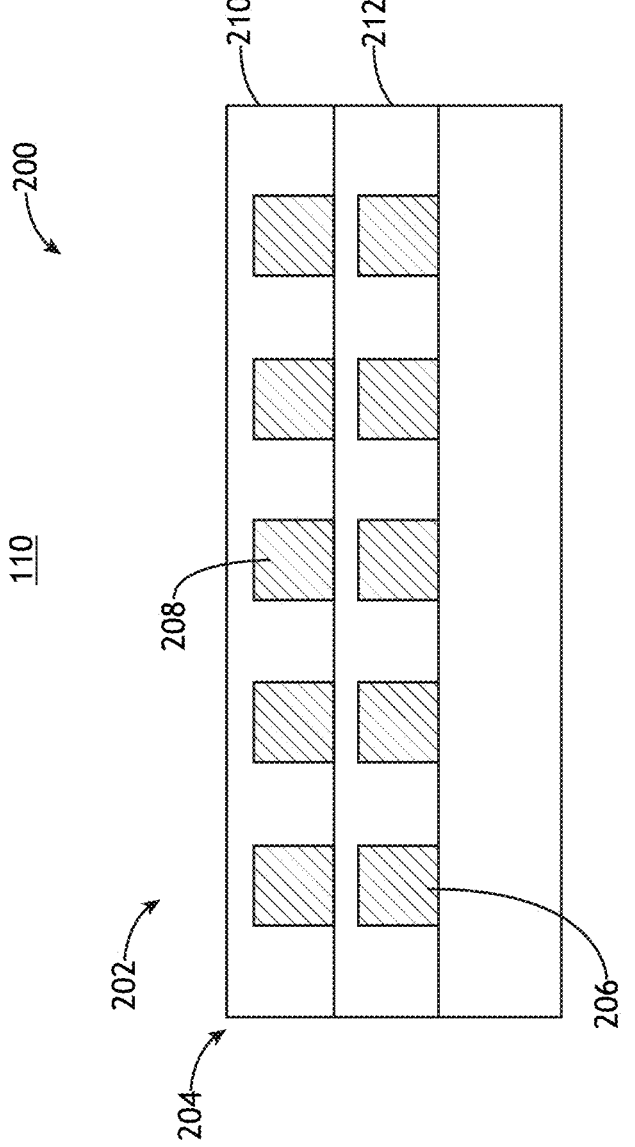
FIG. 2 is a side view of a SCOL overlay target suitable for scatterometry overlay measurements by the DCS metrology system, in accordance with one or more embodiments of the present disclosure.

FIG. 2 is a side view of a SCOL overlay target 200 suitable for scatterometry overlay measurements by the DCS metrology system 100, in accordance with one or more embodiments of the present disclosure.

In embodiments, the SCOL overlay target 200 includes one or more cells 202 having one or more periodic features 206, 208 formed as overlapping grating structures 204 on the sample 110. For example, the one or more cells 202 may include a first periodic feature 206 on a first layer 210 and a second periodic feature 208 on a second layer 212, where the first periodic feature 206 overlaps with the second periodic feature 208 to form an overlapping grating structure 204 on the sample 110.

In embodiments, the periodic features of the SCOL overlay target 200 act as a diffraction grating to generate diffracted light by separating the broadband illumination beams into a plurality of wavelengths. For example, the periodic features 206, 208 of the SCOL overlay target 200 on the surface of the sample 110 may separate the one or more lobes of the dual frequency comb illumination beam 108 into a plurality of wavelengths at a plurality of diffraction angles.

The SCOL overlay target 200 may generally be formed from any number of cells 202 and any particular cell 202 may include overlapping grating structures 204 with a periodicity along any direction. For example, the SCOL overlay target 200 may include multiple cells 202 with grating structures 204 having periodicity along a common direction, where the different cells 202 have different configurations of the periodicities of the associated gratings.

It is to be understood, however, that the SCOL overlay target 200 in FIG. 2 and the associated description are provided solely for illustrative purposes and should not be interpreted as limiting. Rather, the SCOL overlay target 200 may include any suitable grating-over-grating overlay target design. For example, a metrology target may include any number of cells 202 suitable for measurements along two directions. Further, the cells 202 may be distributed in any pattern or arrangement. For example, metrology target designs suitable for scanning metrology are generally described in U.S. Pat. No. 11,073,768 issued on Jul. 27, 2021, which is incorporated herein by reference in its entirety. In embodiments, the SCOL overlay target 200 includes one or more cell groupings distributed along a scanning direction (e.g., a direction of motion of the sample 110), where cells 202 within each particular cell grouping are oriented to have periodic features 206 periodic along a common direction. For instance, a first cell grouping may include one or more cells 202 having periodicities along the X direction and a second cell grouping may include one or more cells 202 having periodicities along the Y direction. In this way, all cells 202 within a particular cell grouping may be imaged at the same time while the sample 110 is scanned with the DCS metrology system 100. By way of another example, diagonal targets suitable for metrology measurements in orthogonal directions in a single scan are described generally in U.S. Patent Publication No. 2021/0364935 published on Nov. 25, 2021, which is incorporated herein by reference in its entirety.

In this configuration, the first-order diffraction may be spectrally dispersed in the pupil image such that different spectral components (e.g., wavelengths) of the dual frequency comb illumination beam 108 are diffracted into different locations of the pupil image. Such a configuration may enable robust metrology measurements with one or more wavelengths in the dual frequency comb illumination beam 108. Metrology measurements based on spectrally-dispersed diffraction are generally described in U.S. patent application Ser. No. 18/370,136 filed on Sep. 19, 2023, which is incorporated herein by reference in its entirety. It is contemplated herein that the systems and methods disclosed herein may utilize dual comb spectroscopy techniques to implement metrology measurements described in any of the above references.

In some embodiments, the DCS metrology system 100 is configured to generate multi-spectral metrology measurements of a metrology target in a scan configuration.

For example, the sample 110 is scanned through a field of view of the DCS metrology system 100 during a measurement. Scanning metrology measurements are generally described in U.S. Pat. No. 11,300,405 issued Apr. 12, 2022; U.S. Pat. No. 11,378,394 issued Jul. 5, 2022; U.S. Patent Publication No. 2023/0314319 published on Oct. 5, 2023; U.S. Pat. No. 11,796,925 issued on Oct. 24, 2023; and U.S. patent application Ser. No. 18/642,417 filed on Apr. 22, 2024; all of which are incorporated herein by reference in their entireties. It is contemplated that the systems and methods disclosed herein may utilize dual comb spectroscopy techniques to implement metrology measurements described in any of the above references.

As another example, a phase of a reference beam interfered with sample light 114 may be scanned during a measurement. Metrology measurements utilizing a reference beam interfered with sample light 114 is generally described in U.S. patent application Ser. No. 18/110,746 filed on Feb. 16, 2023, which is incorporated herein by reference in its entirety. It is contemplated that the systems and methods disclosed herein may utilize dual comb spectroscopy techniques to implement metrology measurements described in the above reference.

Figure 1D:
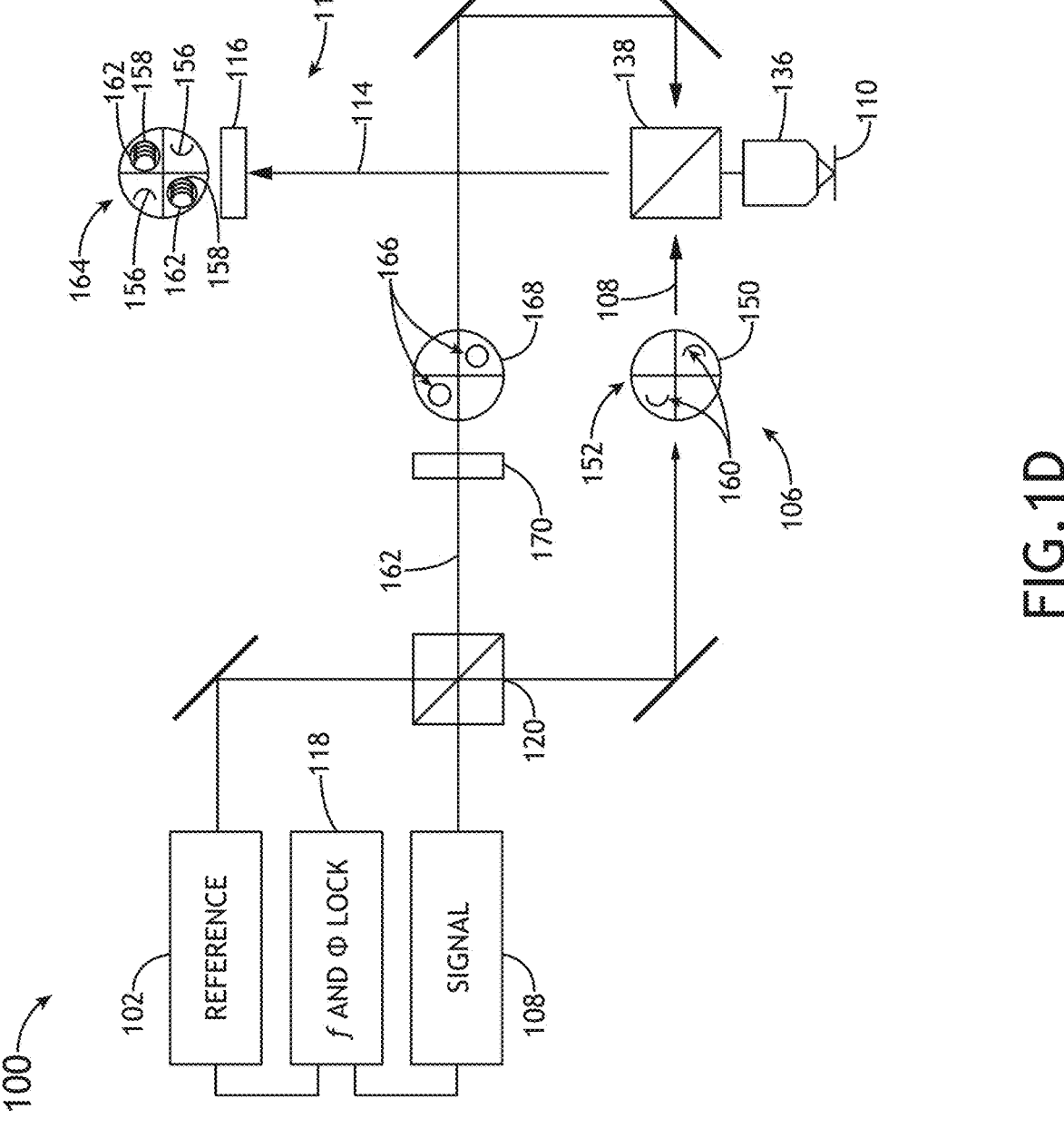
FIG. 1D illustrates a schematic of the DCS metrology system configured for multi-spectral first-order diffraction metrology of metrology targets in a phase-scanning configuration, in accordance with one or more embodiments of the present disclosure.

FIG. 1D illustrates a schematic of the DCS metrology system 100 configured for multi-spectral first-order diffraction metrology of metrology targets in a phase-scanning configuration, in accordance with one or more embodiments of the present disclosure. The configuration in FIG. 1D may be suitable for, but is not limited to, metrology measurements on a SCOL overlay target 200 as depicted in FIG. 2.

FIG. 1D is substantially similar to FIG. 1C, except that a portion of the dual frequency comb illumination beam 108 is split off by the beam splitter 120 to form a reference beam 162. This reference beam 162 is then overlapped with the sample light 114 (e.g., by the beam splitter 138) to generate interference at the detector 116.

In some embodiments, lobes of the dual frequency comb illumination beam 108 and/or the reference beam 162 are shaped to promote overlap of spectrally-dispersed diffraction (e.g., spectrally-dispersed first-order diffraction 158) with the reference beam 162. For example, the curved apertures 160 (e.g., arc-shaped or crescent shaped) in the apodizer 150 in FIG. 1D result in spectrally-dispersed first-order diffraction 158 (shown in inset 164) with a curved distribution that facilitates efficient overlap with the lobes of a circular reference beam 162.

In particular, FIG. 1D depicts a configuration in which crescent-shaped curved apertures 160 of the apodizer 150 in the illumination sub-system 106 are oriented to provide a constant thickness along a vertical direction (e.g., orthogonal to a measurement direction associated with spectral dispersion of non-zero diffraction) to promote a uniform distribution of spectral components of the first-order diffraction 158 on the detector 116. Further, the curvature of the crescent-shaped curved apertures 160 and the associated curvature of the first-order diffraction 158 promotes overlap with the circular reference beam 162 on the detector 116 (e.g., shown in inset 164) formed from circular apertures 166 in an apodizer 168 in a path of the reference beam 162.

However, it is to be understood that the particular shapes of the dual frequency comb illumination beam 108 and the reference beam 162 shown in FIG. 1D are merely illustrative and should not be interpreted as limiting the scope of the present disclosure. The dual frequency comb illumination beam 108 and the reference beam 162 may have any shapes suitable for providing an overlap of the reference beam 162 with spectrally-dispersed first-order diffraction 158.

In some embodiments, as illustrated in FIG. 1D, the DCS metrology system 100 includes a phase modulator 170 to selectively modify a phase of the sample 110 during a measurement. For example, the phase modulator 170 may scan a phase of the reference beam 162 to generate time-varying interference patterns between the reference beam 162 and the first-order diffraction 158 on the detector 116 during a measurement. In this configuration, the controller 122 may generate metrology measurements (e.g., overlay measurements) based on the multi-spectral time-varying interference patterns.

Figure 1E:
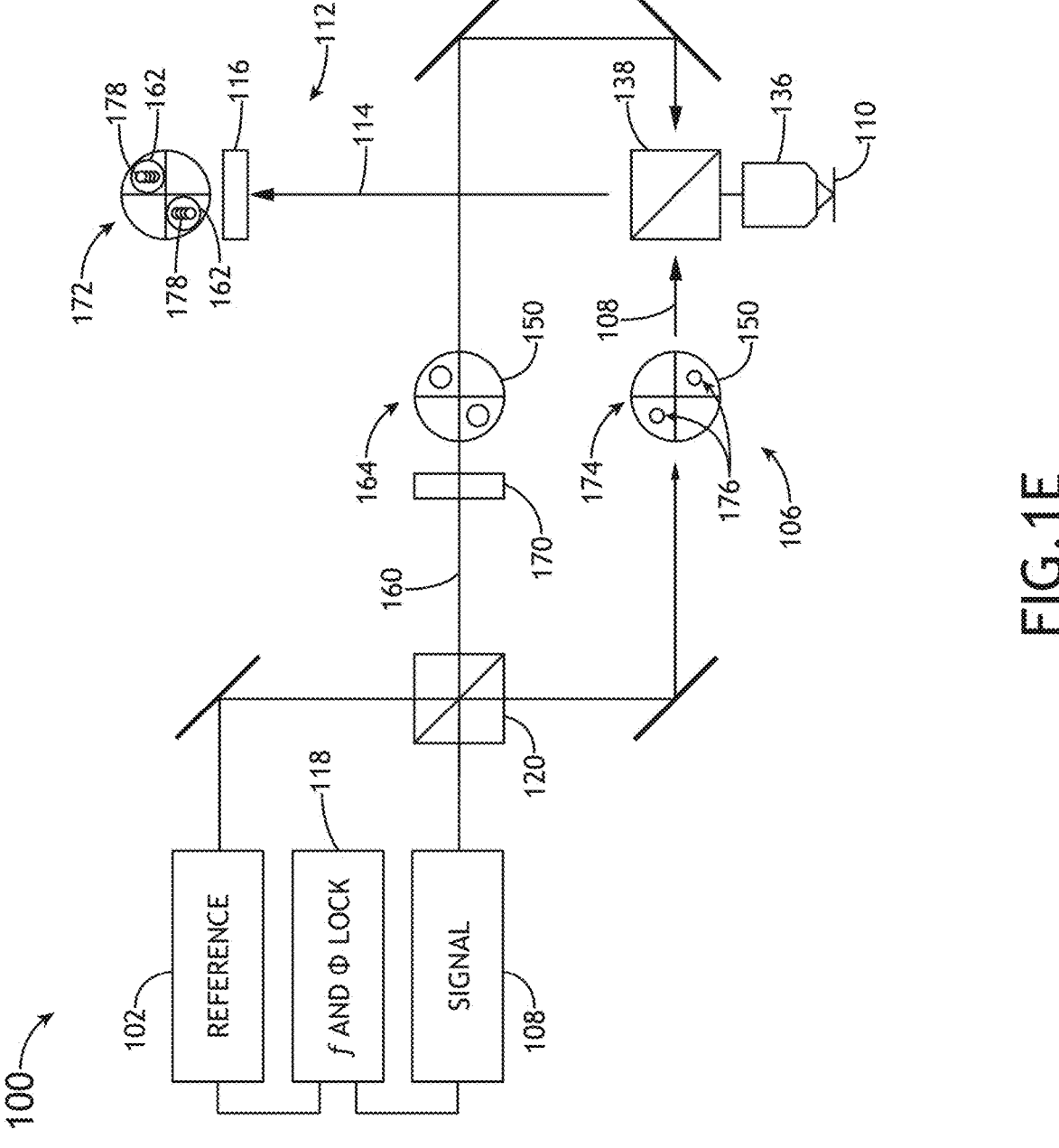
FIG. 1E illustrates a schematic of the DCS metrology system configured for multi-spectral Moiré-based metrology of metrology targets in a phase-scanning configuration, in accordance with one or more embodiments of the present disclosure.

FIG. 1E illustrates a schematic of the DCS metrology system 100 configured for multi-spectral Moiré-based metrology of metrology targets in a phase-scanning configuration, in accordance with one or more embodiments of the present disclosure. FIG. 1E may be suitable for, but not limited to, generating metrology measurements of a Moiré overlay target including overlapping features with different periodicities.

Figure 3A:
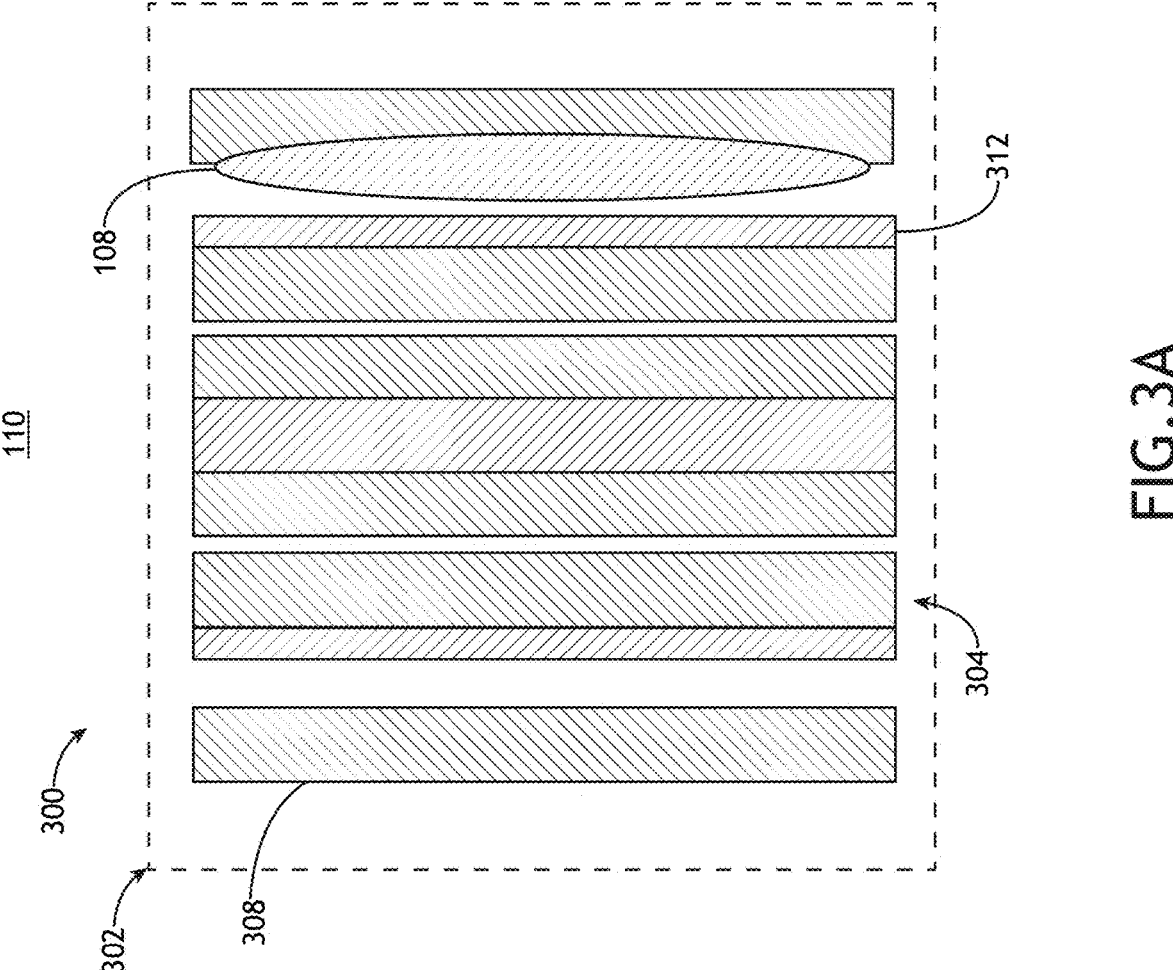
FIG. 3A is a top view of a cell of a Moiré overlay target with a Moiré structure 304, in accordance with one or more embodiments of the present disclosure.
Figure 3B:
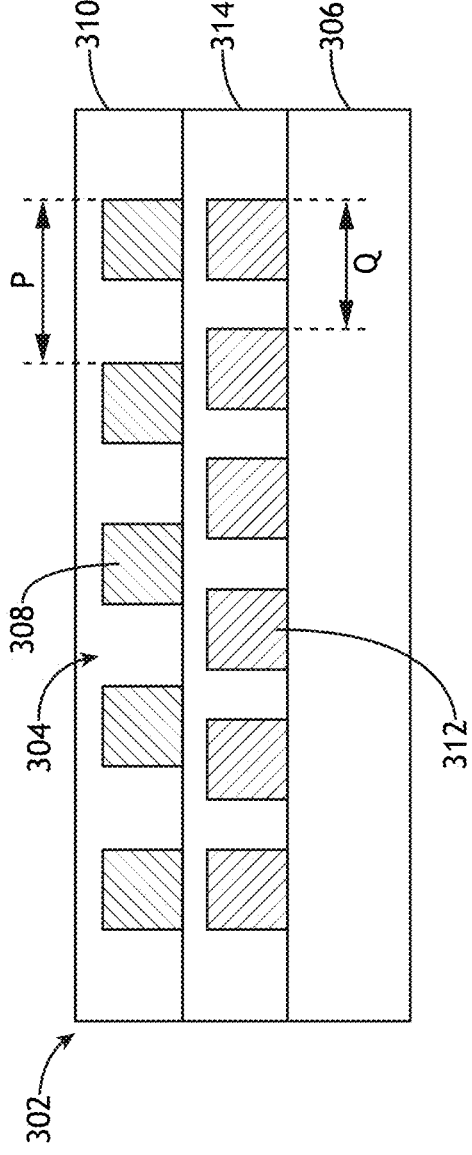
FIG. 3B is a side view of a single cell of the Moiré overlay target in FIG. 3A on a substrate, in accordance with one or more embodiments of the present disclosure.

FIG. 3A is a top view of a cell 302 of a Moiré overlay target 300 with a Moiré structure 304, in accordance with one or more embodiments of the present disclosure. FIG. 3B is a side view of a single cell 302 of the Moiré overlay target

300 in FIG. 3A on a substrate 306, in accordance with one or more embodiments of the present disclosure. In some embodiments, the Moiré structure 304 includes a first-layer grating 308 (e.g., a top grating) located on a first layer 310 of the sample 110 and a second-layer grating 312 (e.g., a bottom grating) located on a second layer 314 of the sample 110 oriented such that the regions including the first-layer grating 308 and the second-layer grating 312 overlap to form a grating-over-grating structure. Further, the first-layer grating 308 and the second-layer grating 312 have different pitches. For example, FIG. 3B illustrates the pitches of the first-layer grating 308 and the second-layer grating 312 as P and Q, respectively.

A Moiré overlay target 300 may generally be formed from any number of cells 302 and any particular cell 302 may include a Moiré structure 304 with a periodicity along any direction. Further, in some embodiments, a Moiré overlay target 300 includes multiple cells 302 with Moiré structures 304 having periodicity along a common direction, where the different cells 302 have different configurations of the periodicities of the associated gratings.

It is noted that FIG. 1E is substantially similar to FIG. 1D except for the depicted design of the apodizer 150 for shaping the dual frequency comb illumination beam 108 and the distribution of diffraction orders in the collected pupil image shown in inset 172, which is based on diffraction by the Moiré overlay target 300 in FIGS. 3A-3B. In particular, the inset 174 in FIG. 1E depicts an apodizer 150 with circular apertures 176 to generate circular lobes of first-order diffraction 158, which may promote overlap between the reference beam 162 and the various diffraction orders 178 on the detector 116. As described with respect to FIG. 1D, the controller 122 may generate metrology measurements (e.g., overlay measurements) based on multi-spectral time-varying interference patterns associated with scanning phase values of the reference beam 162. For instance, such measurements may correspond to variations of measurements described in U.S. Patent Publication No. 2023/0314319 published on Oct. 5, 2023; U.S. Pat. No. 11,796,925 issued on Oct. 24, 2023; and U.S. patent application Ser. No. 18/642,417 filed on Apr. 22, 2024; all of which are incorporated herein by reference in their entireties, where the measurements utilize dual frequency comb spectroscopy techniques as disclosed herein.

Referring generally to FIGS. 1B-1E, the DCS metrology system 100 may be configured to provide different measurements in different modes. In this way, the DCS metrology system 100 may be a flexible platform for a wide variety of measurements at multiple sample locations (e.g., in-die locations, scribe line locations, or the like). For example, the DCS metrology system 100 may provide a single tool providing high frequency on-target after development inspection (ADI) metrology (e.g., based on measurements of metrology targets using configurations depicted in FIGS. 1C-1E as non-limiting examples) and in-die after etch inspection (AEI) non-zero offset calibration. Further, the specific metrology targets depicted in FIGS. 2-3B are provided solely for illustrative purposes and should not be interpreted as limiting the scope of the present disclosure. Rather, the DCS metrology system 100 may characterize any type of metrology target. In some embodiments, the DCS metrology system 100 characterizes overlay targets typically used in image-based systems such as, but not limited to, an advanced imaging overlay (AIM) target or a robust AIM target.

In some embodiments, the DCS metrology system 100 combines measurements from different modes to increase a measurement accuracy, sensitivity, or robustness. For example, the configuration in FIG. 1B may be provide one or more measurements indicative of physical properties of a measured region of the sample 110 (e.g., device features, a dedicated metrology target, or the like) such as, but not limited to, tilt or CD. Further, such physical properties, which may be referred to as shape information, may impact other metrology measurements such as, but not limited to, overlay measurements. However, knowledge of this shape information may be used to correct or calibrate such metrology measurements (e.g., correct or calibrate overlay measurements).

As an illustration, the DCS metrology system 100 may generate a first metrology measurement (e.g., an overlay measurement) of a region of the sample 110 (e.g., an overlay metrology target) with a first configuration (e.g., one of the configurations depicted in FIGS. 1C-1E, or the like) and also generate a second metrology measurement (e.g., a measurement of shape information such as tilt, CD, or the like) of the same region of the sample 110 or a representative region with a second configuration. The DCS metrology system 100 may then correct the first metrology measurement based on the second metrology measurement. Put another way, the DCS metrology system 100 may measure and compensate for (e.g., subtract) a target shape impact from a measurement of a target.

FIG. 4 is a flow diagram illustrating steps performed in a method 400 for metrology based on dual comb spectroscopy, in accordance with one or more embodiments of the present disclosure. The embodiments and enabling technologies described previously herein in the context of the DCS metrology system 100 should be interpreted to extend to the method 400. For example, the processors 124 of the controller 122 may execute program instructions causing the one or more processors 124 to implement the various steps of the method 400 either directly or indirectly by providing control signals to additional components of the DCS metrology system 100. However, that the method 400 is not limited to the architecture of the DCS metrology system 100.

In some embodiments, the method 400 includes a step 402 of receiving a RF signal from a detector 116 associated with sample light from a sample 110 in response to a dual frequency comb illumination beam 108 including two frequency combs 104 with different repetition rates. In some embodiments, the method 400 includes a step 404 of extracting spectral measurement data associated with the sample 110 from the RF signal. For example, the RF signals may correspond to beat signals from the two frequency combs 104, where optical spectroscopy data of the sample 110 (e.g., a spectral response of the sample 110 to the wavelengths in the dual frequency comb illumination beam 108) are embedded in the frequency domain of the RF signals. Accordingly, the step 404 may include using a frequency analysis technique such as, but not limited to, a Fourier Transform technique to extract the spectral measurement data from the RF signals.

In some embodiments, the method 400 includes a step 406 of generating one or more metrology measurements of the sample 110 based on the spectral measurement data. The metrology measurements may include any type or combination of types of metrology measurements including, but not limited to, overlay measurements, CD measurements, tilt measurements, or the like.

It is contemplated herein that the method 400 may be utilized to generate a wide range of measurements based on a wide range of configurations of the dual frequency comb illumination beam 108, the sample 110, and collection of sample light 114. In some embodiments, the metrology measurements are based on Mueller matrix elements associated with the sample 110 extracted from the RF signals using SE techniques. Such an approach may be well suited for, but not limited to, in-die measurements or shape measurements of metrology targets. In some embodiments, the metrology measurements are based on analysis of diffraction orders generated by a sample 110 including periodic features (e.g., grating structures). Such an approach may be well suited for, but not limited to, multi-spectral measurements of diffraction dedicated metrology targets (e.g., dedicated overlay targets). In some embodiments, the method 400 is applied to generate measurements using both SE techniques and diffraction-based techniques. In this way, shape information of a metrology target measured with the SE techniques may be used to correct or calibrate a diffraction-based measurement.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A metrology system comprising:
a controller including one or more processors configured to execute program instructions causing the one or more processors to implement a metrology recipe by:
receiving a radio-frequency signal from a detector associated with illumination of a sample with a dual frequency comb illumination beam through an objective lens with an illumination sub-system and collection of sample light from the sample in response to the dual frequency comb illumination beam with the objective lens by a collection subsystem, wherein the dual frequency comb illumination beam includes two frequency combs with different repetition rates, wherein the illumination subsystem includes an illumination polarizer and a rotatable illumination phase plate in an illumination path of the dual frequency comb illumination beam, wherein the collection sub-system includes a rotatable collection phase plate and an analyzer in an optical path of the sample light;

extracting spectral measurement data associated with the sample from the radio-frequency signal; and generating one or more metrology measurements of the sample based on the spectral measurement data, wherein generating the one or more metrology measurements of the sample based on the spectral measurement data comprises:

reconstructing data indicative of one or more Mueller matrix elements associated with the sample based on the spectral measurement data; and generating the one or more metrology measurements based on the data indicative of the one or more Mueller matrix elements.

2. The metrology system of claim 1, wherein the one or more metrology measurements comprise:

at least one of an overlay measurement, a tilt measurement, or a critical dimension measurement.

3. The metrology system of claim 1, wherein at least a portion of the radio-frequency signal is associated with zero-order diffraction from the sample, wherein at least a portion of the data indicative of the one or more Mueller matrix elements is associated with the zero-order diffraction from the sample.

4. The metrology system of claim 1, wherein the illumination sub-system illuminates an in-die portion of the sample, wherein the one or more metrology measurements comprise in-die measurements.

5. The metrology system of claim 1, wherein the illumination sub-system includes an illumination apodizer to generate one or more off-axis illumination lobes from the dual frequency comb illumination beam, wherein at least a portion of the radio-frequency signal is associated with first-order diffraction of the one or more off-axis illumination lobes by the sample.

6. The metrology system of claim 5, wherein the illumination apodizer includes one or more curved apertures.

7. The metrology system of claim 6, wherein the one or more curved apertures are shaped as one or more crescents.

8. The metrology system of claim 5, wherein the illumination sub-system illuminates a metrology target on the sample.

9. The metrology system of claim 8, wherein the metrology target comprises:

an overlay metrology target.

10. The metrology system of claim 9, wherein the metrology target comprises:

at least one of an advanced imaging metrology (AIM) target or a robust AIM target.

11. The metrology system of claim 9, wherein the metrology target comprises:

a scatterometry overlay (SCOL) target.

12. The metrology system of claim 8, wherein the illumination sub-system further provides an additional dual frequency comb illumination beam, wherein the illumination sub-system further comprises:

an adjustable phase modulator and an additional apodizer in an optical path of the additional dual frequency comb illumination beam, wherein the additional apodizer generates one or more reference lobes of the additional dual frequency comb illumination beam; and an additional beam combiner to overlap the sample light with the one or more reference lobes of the additional dual frequency comb illumination beam to generate an interference pattern on the detector;

wherein the radio-frequency signal includes phase-scan data associated with scanning a phase of the additional dual frequency comb illumination beam with the adjustable phase modulator.

13. The metrology system of claim 12, wherein the metrology target comprises a scatterometry overlay (SCOL) target, wherein at least a portion of the phase-scan data is associated with the first-order diffraction of the one or more off-axis illumination lobes by the sample.

14. The metrology system of claim 12, wherein the metrology target comprises one or more Moiré structures, wherein at least a portion of the phase-scan data is associated with the first-order diffraction of the one or more off-axis illumination lobes by the one or more Moiré structures.

15. A metrology system comprising:

a dual frequency comb source comprising:

a first frequency comb source providing a first comb beam with a first repetition rate;

a second frequency comb source providing a second comb beam with a second repetition rate; and one or more beamsplitters to generate one or more dual frequency comb illumination beams from the first comb beam and the second comb beam;

a beam combiner to combine the first comb beam and the second comb beam to form a dual frequency comb illumination beam;

an illumination sub-system including one or more optical elements configured to illuminate a sample with the dual frequency comb illumination beam through an objective lens and a collection sub-system including one or more additional optical elements to collect sample light from the sample in response to the dual frequency comb illumination beam with the objective lens, wherein the illumination sub-system includes an illumination polarizer and a rotatable illumination phase plate in an illumination path of the dual frequency comb illumination beam, wherein the collection sub-system includes a rotatable collection phase plate and an analyzer in an optical path of the sample light;

a detector at a pupil plane of the collection sub-system configured to capture a radio-frequency signal based on the sample light; and a controller including one or more processors configured to execute program instructions causing the one or more processors to implement a metrology recipe by:

receiving the radio-frequency signal from the detector;

extracting spectral measurement data associated with the sample from the radio-frequency signal; and generating one or more metrology measurements of the sample based on the spectral measurement data, wherein generating the one or more metrology measurements of the sample based on the spectral measurement data comprises:

reconstructing data indicative of one or more Mueller matrix elements associated with the sample based on the spectral measurement data; and generating the one or more metrology measurements based on the data indicative of the one or more Mueller matrix elements.

16. The metrology system of claim 15, wherein the one or more metrology measurements comprise:

at least one of an overlay measurement, a tilt measurement, or a critical dimension measurement.

17. The metrology system of claim 15, wherein at least a portion of the radio-frequency signal is associated with zero-order diffraction from the sample, wherein at least a portion of the data indicative of the one or more Mueller matrix elements is associated with the zero-order diffraction from the sample.

18. The metrology system of claim 15, wherein the illumination sub-system illuminates an in-die portion of the sample, wherein the one or more metrology measurements comprise in-die measurements.

19. The metrology system of claim 15, wherein the illumination sub-system includes an illumination apodizer to generate one or more off-axis illumination lobes from the dual frequency comb illumination beam, wherein at least a portion of the radio-frequency signal is associated with first-order diffraction of the one or more off-axis illumination lobes by the sample.

20. The metrology system of claim 19, wherein the illumination apodizer includes one or more curved apertures.

21. The metrology system of claim 20, wherein the one or more curved apertures are shaped as one or more crescents.

22. The metrology system of claim 19, wherein the illumination sub-system illuminates a metrology target on the sample.

23. The metrology system of claim 22, wherein the metrology target comprises:

an overlay metrology target.

24. The metrology system of claim 23, wherein the metrology target comprises:

at least one of an advanced imaging metrology (AIM) target or a robust AIM target.

25. The metrology system of claim 23, wherein the metrology target comprises:

a scatterometry overlay (SCOL) target.

26. The metrology system of claim 22, wherein the illumination sub-system provides an additional dual frequency comb illumination beam, wherein the illumination sub-system further comprises:

an adjustable phase modulator and an additional apodizer in an optical path of the additional dual frequency comb illumination beam, wherein the additional apodizer generates one or more reference lobes of the additional dual frequency comb illumination beam; and an additional beam combiner to overlap the sample light with the one or more reference lobes of the additional dual frequency comb illumination beam to generate an interference pattern on the detector;

wherein the radio-frequency signal includes phase-scan data associated with scanning a phase of the additional dual frequency comb illumination beam with the adjustable phase modulator.

27. The metrology system of claim 26, wherein the metrology target comprises a scatterometry overlay (SCOL) target, wherein at least a portion of the phase-scan data is associated with the first-order diffraction of the one or more off-axis illumination lobes by the sample.

28. The metrology system of claim 26, wherein the metrology target comprises one or more Moiré structures, wherein at least a portion of the phase-scan data is associated with the first-order diffraction of the one or more off-axis illumination lobes by the one or more Moiré structures.

29. A metrology method comprising:

receiving a radio-frequency signal from a detector at a pupil plane of an optical sub-system, wherein the optical sub-system is configured to illuminate a sample with a dual frequency comb illumination beam through an objective lens and collect sample light from the sample in response to the dual frequency comb illumination beam with the objective lens, wherein the dual frequency comb illumination beam includes two frequency combs with different repetition rates, wherein the optical sub-system includes an illumination polarizer and a rotatable illumination phase plate in an illumination path of the dual frequency comb illumination beam and a rotatable collection phase plate and an analyzer in an optical path of the sample light;

extracting spectral measurement data associated with the sample from the radio-frequency signal; and generating one or more metrology measurements of the sample based on the spectral measurement data, wherein generating the one or more metrology measurements of the sample based on the spectral measurement data comprises:

reconstructing data indicative of one or more Mueller matrix elements associated with the sample based on the spectral measurement data; and generating the one or more metrology measurements based on the data indicative of the one or more Mueller matrix elements.

* * * * *